United States Patent

[11] 3,603,299

| [72] | Inventor | Enrico Lamperti<br>Via Ercole Ferrario, 4, Gallarate Varese, Italy |
|---|---|---|
| [21] | Appl. No. | 805,126 |
| [22] | Filed | Mar. 7, 1969 |
| [45] | Patented | Sept. 7, 1971 |
| [32] | Priority | Mar. 9, 1968 |
| [33] | | Italy |
| [31] | | 13,754 |

[54] ROTATING DISTRIBUTOR DEVICE SEATED WITHIN THE CYLINDER HEAD FOR ENDOTHERMIC TWO- OR FOUR-STROKE-CYCLE OR DIESEL ENGINES
7 Claims, 13 Drawing Figs.

[52] U.S. Cl. ..................................... 123/190 D,
 123/190 DL, 123/190 E, 123/190 CA
[51] Int. Cl. ................................................ F01l 7/00
[50] Field of Search .......................................... 123/190 D,
 190 DI, 190 DL, 190 E; 277/168

[56] References Cited
UNITED STATES PATENTS
| 1,085,604 | 2/1914 | Guillery | 123/190 D |
| 1,292,597 | 1/1919 | Gill | 123/190 D |
| 1,314,137 | 8/1919 | Gamble | 123/190 D |
| 1,726,299 | 8/1929 | Heurich et al. | 123/190 D |
| 2,844,423 | 7/1958 | Arnold | 123/190 D |

FOREIGN PATENTS
| 281,119 | 1/1931 | Italy | 123/180 D |
| 424,010 | 5/1911 | France | 123/180 D |
| 465,751 | 4/1914 | France | 123/180 D |
| 644,271 | 9/1928 | France | 123/180 D |
| 882,064 | 5/1943 | France | 123/180 D |
| 167,597 | 5/1934 | Switzerland | 123/180 D |

*Primary Examiner*—Mark M. Newman
*Assistant Examiner*—Ronald B. Cox
*Attorney*—Christen & Sabol ABSTRACT: A rotary disc valve for reciprocating internal combustion engines constitutes a disc mounted adjacent the end wall of a cylinder for rotation concentric with the cylinder axis. The disc has annular seals provided in the peripheral surface of the disc and the surface facing the end wall, there being a gap between the disc and the end wall to contain lubricating fluid and means to feed lubricant to the gap and to maintain the spacing of the gap constant.

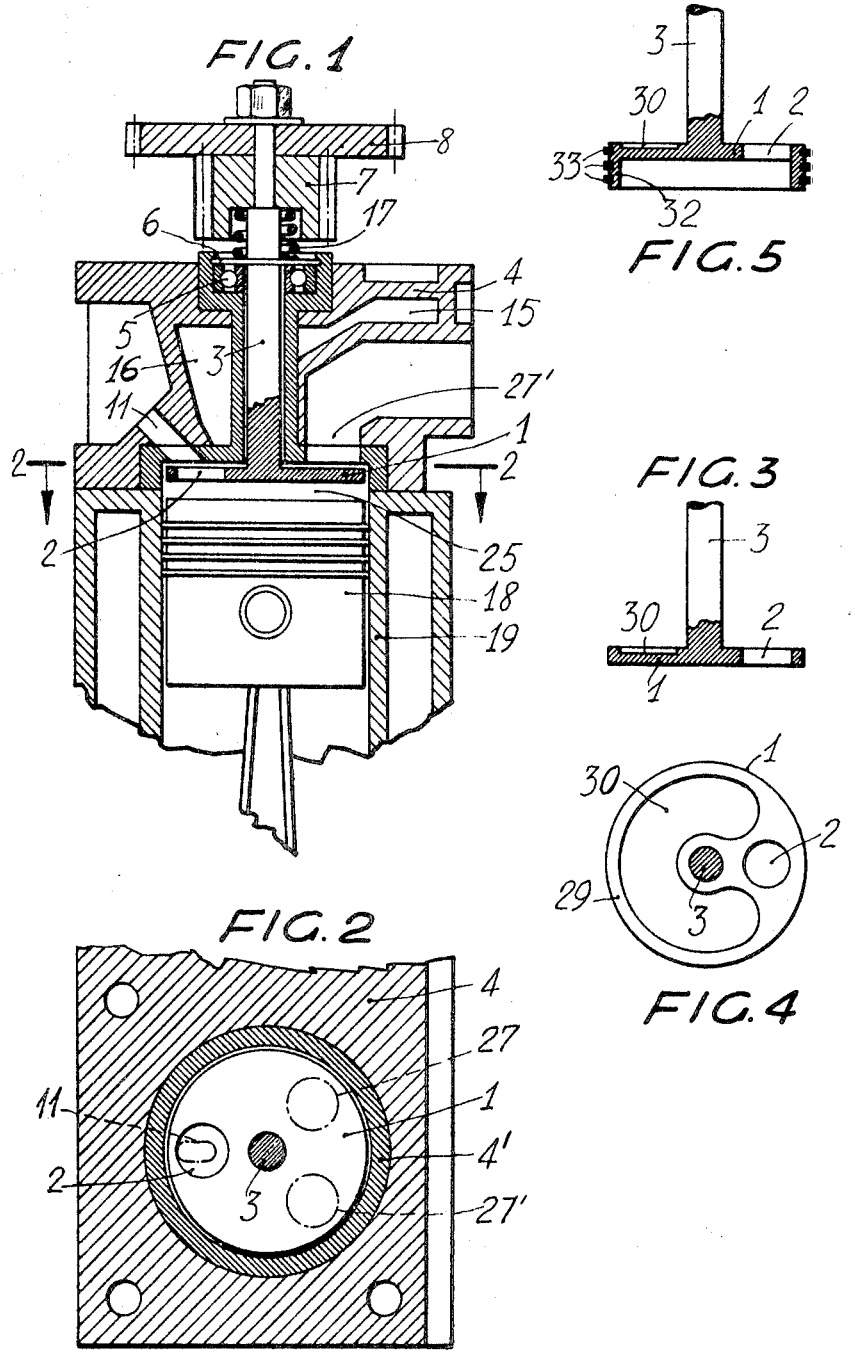

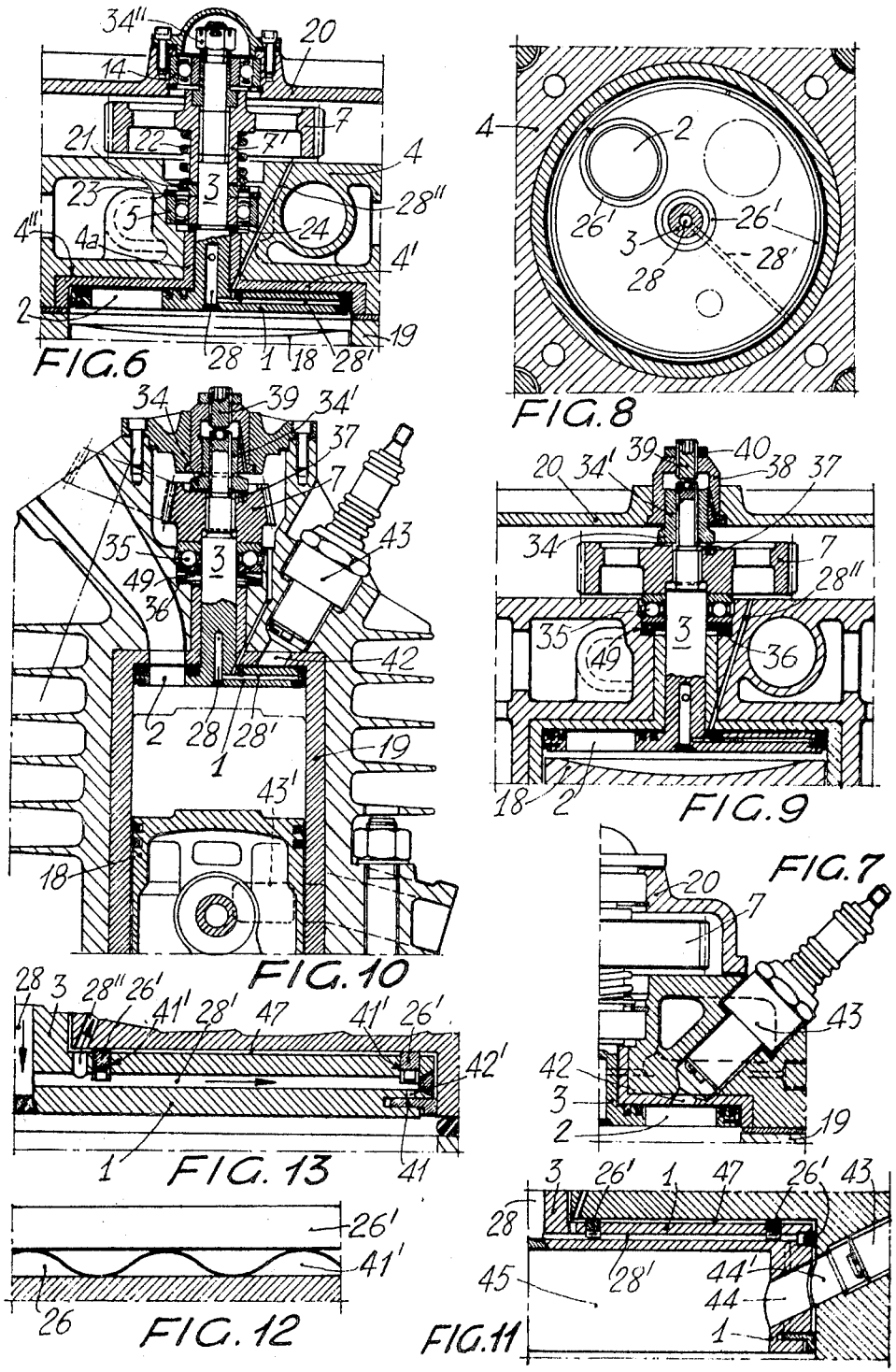

ROTATING DISTRIBUTOR DEVICE SEATED WITHIN THE CYLINDER HEAD FOR ENDOTHERMIC TWO- OR FOUR-STROKE-CYCLE OR DIESEL ENGINES

An object of the present invention is to provide a highly efficient mechanical system for solving the problem of timing the explosions of internal combustion engines using liquid fuel.

The principles of operation and the construction of the present device produces practical results insofar as power and mechanical efficiency are concerned, as have not previously been obtained, because of the utilization of balanced forces in operation. Moreover, the device is simply constructed to accomplish the desired purpose of a reduction of friction and mechanical noise.

The device according to the present invention comprises a cylindrical distributor disc having an axial upwardly extending driving pin for connection with means rotationally driving the pin. The disc is also provided with an aperture extending therethrough positioned to control the timing of the engine in response to rotation of the disc. The device may be located within the cylinder head or in the cylinder itself at the uppermost portion thereof. A seat for the distributor disc can be provided by a liner inserted in the cylinder or the cylinder head.

In addition to providing an elementary form of embodiment, the device according to the invention can also be designed with more sophisticated refinements so that it may be adapted to all forms of piston internal combustion engines to achieve maximum efficiency. Particularly, the following elements are provided: a screwed cap made fast with the head and capable of containing, axially retaining and supporting the thrust of the axial rotating disc pin; a lubricating system for the rotating disc; a plurality of sealing gaskets or segments both on the disc with respect to the cylinder and on the upper surface thereof and about the aperture with respect to the cylinder top where the supply, exhaust and ignition apertures are provided; in a different embodiment said disc has a cylindrical extension and in said extension a hole coaxial with the sparking plug seat hole during disc rotation at the predetermined ignition time, said sparking plug seat hole being below (in the figure) the rotating distributor disc between the latter and piston head, which in this case may assume a convenient shape; the preferred prevision of a L-shaped segment, or also of an ordinary type, on the cylindrical periphery of the distributor disc to attain a higher sealing particularly at compression and explosion steps; and the provision of undulated springs associated with the sealing gaskets for constantly urging the latter to sealing position.

In the following detailed description reference is made to the appended drawing, wherein some embodiments of the invention are shown.

Of course, the drawing is set forth only by way of indication and not in a limiting sense, and also any changes, as required or expedient for particular applications, or shape changes in details, or other improvements not altering the essence of the inventive features.

In the drawing:

FIG. 1 is a vertical section of a cylinder head according to the invention;

FIG. 2 is a cross section of FIG. 1 according to a plane through 2—2;

FIGS. 3 and 4 are side and plane views, respectively, showing the rotating disc, particularly for a four-stroke-cycle engine;

FIG. 5 shows a modified form with respect to FIG. 3;

FIG. 6 is a vertical section showing the head of a four-stroke-cycle engine, as restricted to the upper portion thereof;

FIG. 7 shows one half of said head, as sectioned on the sparking plug plane;

FIG. 8 is a cross section of FIG. 6, taken along the plane through 8—8;

FIG. 9 is a modified form of FIG. 6;

FIG. 10 is a vertical section showing the head of a two-stroke-cycle engine, taken along the plane through the sparking plug;

FIG. 11 is a detailed view showing a distributor disc with sparking plug;

FIG. 12 shows a length of undulated thrust spring for a packing ring; and

FIG. 13 is an enlarged view of a detail in FIG. 6.

The device assembly shown in FIG. 1 comprises the following elements: the distributor or rotating disc 1 of a suitable thickness and having an eccentric hole 2 and a pin 3 coaxial with head 4, at the top being guided by bearing 5 which is held in place by the resilient washer 6. Gear 7, driven by the driving shaft (not shown), and gear 8 driving a similar gear mounted on the adjacent cylinders are keyed on the upper portion of pin 3. At the bottom, head 4 has a seat for said rotating disc 1, which head can be coated with a proper alloy liner 4' and has three circular apertures, an aperture 11 of which is for accommodating the sparking plug and apertures 27 and 27' of which are for exhaust and suction respectively. Head 4 is cooled by water circulation in spaces 15 and 16. Pin 3 upwardly urged by spring 17. The conventional type of piston 18 moves within cylinder 19 as cooled by known systems, and explosion chamber 25 is located at the interspace between disc 1 and piston head 18.

The radial axes of the three apertures 11, 27 and 27' are respectively offset to one another.

As shown in FIGS. 3 and 4, disc 1 has an upper sliding edge 29, a through hole 2 and lubricant recess 30.

A modified form of FIG. 3 is shown in FIG. 5, wherein disc 1 is provided with cylindrical flange 32 carrying the sealing rings 33 on the periphery thereof.

By preferred means, drive is transmitted to gear 7 attached to pin 3 by a driving shaft operating at half the speed of the engine shaft.

Referring to the modified form as shown in FIGS. 6, 7 and 8, it will be seen that the upper head 4 of cylinder 19 carries a seat 4" wherein liner 4' is mounted and made integral, this liner 4' having the axial tubular length 4a; the cylindrical hollow liner 4' follows the cylindrical contour of cylinder 19, wherein the piston 18 moves, and accommodates disc 1 which is rotatably mounted within said hollow liner 4' and provided with the axial pin 3, substantially rotating within the tubular portion 4a, guided by the first bearing 5 and at its end by a second bearing 14 carried on cap 20, attached to head 4; driven gear 7, is keyed to pin 3 between said two bearings 5 and 14 and drives disc 1.

At the bottom, said gear 7 is provided with a sleeve 7' so as to be interposed between the two bearings 5 and 14, whereas spacing washer 21 and spring 22 are interposed between said gear 7 and the lower bearing. By means of resilient ring 23, said bearing 5 is secured to head 4 at a proper seat. A flushing ring 24 is interposed between bearing 5 and a lower step in pin 3, whereby tolerance adjustment in a vertical direction is provided between said distributor disc 1 and seat thereof. When adjusted said disc 1 is prevented from axially displacing; this vertical clamping condition is ensured by reaction of spring 22 (which may be replaced by a rigid sleeve), as interposed between gear 7 and bearing 5. Spring 22 accomplishes the function of returning springs 26 of disc seals 26' to the desired position and loaded as required, and ultimately to establish the correct position of said disc by a tolerance for providing a gap 47 between disc 1 and seat allowing the oil pressure, as supplied by hole 28, in turn in register with the lubricating circuit when said piston is at bottom dead center at compression and explosion stroke, to constantly provide an oil film within said gap 47 (FIG. 13); said correct position is maintained by the upper nut 34", in turn secured by a preferred stop member.

At the expansion and exhaust stroke, the lubricant under pressure in conduits 28 and 28' is returned through conduit 28" to provide for oil renewal for the next cycle.

The oil film in gap 47 is capable of resisting the compression and explosion thrust without other members being involved in the operation, thus reducing the friction between the disc and seat thereof with a resulting restriction in wear.

In FIGS. 9 and 10 spring 22 is replaced by cup springs 49.

In the above figures, vertical tolerance adjustment between said distributor disc 1 and seat thereof is provided by another system: gear 7 is keyed to pin 3 and directly rests on thrust bearing 35, the latter resting on cup spring 49, either of which being seated within a cylindrical enlargement 36 in head 4; the end sections of pin 3 is threaded for screw engaging a nut 34 which, by bearing against gear 7 at the bottom, can be thoroughly screwed down against spring 49 and springs 26 of disc seals, so as to cause said disc to adhere with its upper face against the upper wall of its seat; nut 34 is now tightened by a stop member 37, cap 20 provided with a coaxial screwed cap 38 and internally adhering to the upper extension 34' of nut 34, is applied and the limit stop member 39, threaded to the cap 38, is screwed down, so exerting a pressure on the head of pin 3. By taking advantage of this stop limit, said pin can be downward urged from the outside by further pressing said cup spring 49 until gap 47 is provided exactly as desired. Finally, stop limit 39 is clamped to a fixed position by nut 40.

Lubrication for the distributor disc is provided by a supply coming axially from channel 28, which introduces the pressure lubricant into the radial channel 28' intercepting the annular channels 41' (FIG. 13), wherein the seals 26' are mounted and axially upwardly urged by springs 26 (FIG. 12) shaped according to a constant undulated contour and, therefore, evenly pressing against seal 26', the working surfaces of which may be chromium plated.

Similar seals are provided about hole 2 of disc 1 (FIGS. 6, 7 and 8). In order to obtain a still better sealing, provision is also made for a segment, preferably L-shaped (FIGS. 12 and 13), carried on the lower edge of the disc or flange, as shown at 41, the L arm facing downward, so that the pressure will cause it to radially spontaneously expand and to press harder against the cylindrical seat wall. Of course, these segments, which can be also of a conventional type, will be also lubricated through suitable channels, as shown at 42' in FIG. 13.

The distributor disc 1, as shown in FIG. 7, illustrates hole 2 when in alignment with conduit 42 communicating with the seat of sparking plug 43.

FIG. 10 shows the head of a two-stroke-cycle engine; therein the position of the distributor disc 1 shows hole 2 at the intake conduit in this case, the exhaust port 43' is at a conventional position in the cylinder.

A modified embodiment of distributor disc is shown in FIG. 11.

It comprises a disc 1 provided with a cylindrical flange 1' having a seal 26' and a segment 45; the height of this flange is such as to allow for forming a coaxial hole 44 therein when intercepting head hole 44', wherein said sparking plug 43 seats. In this case, ignition and explosion occur within the distributor disc bore 45.

From FIGS. 9 and 10 it should also be noted that screwed caps 38 are of different, but substantially equivalent shapes.

The number of seals and sealing segments will depend on the manufactures, who will decide according to the engine features.

The same features will assign the motion drive-type to gear or pulley 7 and from the latter to the other similar gears of the coupled cylinders. Said drive may be provided by idle shafts, or chains, or sets of gears, or toothed belts or other preferred systems, considering that the distributor disc will have to perform half a number of revolutions with respect to the engine.

What is claimed is:

1. A rotary disc valve means for internal combustion engines having a cylinder for a reciprocating piston including a cylinder head provided with an end wall, disc means having an axially extending pin for rotatably supporting said disc means adjacent said end wall for rotation concentric with the longitudinal axis of the cylinder, comprising in combination annular recesses provided in the radially extending surface of said disc means adjacent said end wall of the cylinder head as well as in the side cylindrical wall of said disc means, annular seals arranged in said recesses, means to resiliently urge said seals into sliding engagement with said end wall and sidewall of the cylinder, a gap between said end wall of the cylinder head and the upper surface of the disc means and channel means for introducing lubricant fluid in said gap, said channel means being provided in the disc pin for communication with a source of fluid lubricant pressure as well as with said recesses and with the gap between the disc and the cylinder head, said channel means also including an exhaust channel provided in said cylinder head, said disc means including a channel for communicating with said exhaust channel and means for axially positioning the disc means with respect to said cylinder head for maintaining constant the dimension of the gap, whereby the gap remains filled with lubricating fluid.

2. The invention defined in claim 1, wherein said means to resiliently urge said seals including includes annular strips of undulating spring metal positioned in said recesses beneath said seals.

3. The invention defined in claim 1, wherein said means for axially positioning said disc means and maintaining said gap includes thrust bearing means seated in said cylinder head, adjustable threaded locking means on said pin, and spring means surrounding said pin and positioned between said bearing means and locking means.

4. The invention defined in claim 3, wherein said spring means comprises a cup spring.

5. The invention defined in claim 1, wherein said means for axially positioning said disc means for axially positioning said disc means includes adjustment means threaded on said cylinder head in axial engagement with said pin, and spring means urging said pin into said axial engagement.

6. The invention defined in claim 5, wherein said adjustment means includes thrust bearing means.

7. The invention defined in claim 1, wherein said disc means also includes an annular skirt portion adjacent the end portion of the cylinder wall, said skirt portion being provided with an annular recess, and outwardly expandable resiliently urged L-shaped sealing means disposed in said last-mentioned recess which is also in communication with said first-mentioned recess.